United States Patent
Krishnan et al.

(10) Patent No.: US 10,754,718 B2
(45) Date of Patent: Aug. 25, 2020

(54) GUIDANCE SYSTEM FOR ENTERPRISE INFRASTRUCTURE CHANGE

(71) Applicant: Accenture Global Solutions Limited, Dublin (IE)

(72) Inventors: Mythili Krishnan, Bangalore (IN); Kunal Bhowmick, Bangalore (IN); Vinita Nair, Hyderabad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 101 days.

(21) Appl. No.: 15/727,327

(22) Filed: Oct. 6, 2017

(65) Prior Publication Data

US 2019/0108081 A1    Apr. 11, 2019

(51) Int. Cl.
 *G06F 11/07* (2006.01)
 *G06F 11/32* (2006.01)
 (Continued)

(52) U.S. Cl.
 CPC ........ *G06F 11/079* (2013.01); *G06F 11/0709* (2013.01); *G06F 11/0751* (2013.01); *G06F 11/2247* (2013.01); *G06F 11/321* (2013.01); *G06F 11/3409* (2013.01); *G06Q 10/0639* (2013.01)

(58) Field of Classification Search
 CPC .............. G06F 11/079; G06F 11/0709; G06F 11/0751; G06F 11/2247; G06F 11/321; G06F 11/3408; G06Q 10/0639
 See application file for complete search history.

(56) References Cited

U.S. PATENT DOCUMENTS

| | | | |
|---|---|---|---|
| 7,315,826 B1 * | 1/2008 | Guheen | G06Q 10/06 705/7.29 |
| 2002/0133504 A1 * | 9/2002 | Vlahos | G06F 16/256 |

(Continued)

FOREIGN PATENT DOCUMENTS

| | | |
|---|---|---|
| EP | 2592812 A2 | 5/2013 |
| WO | WO 2008/088998 A2 | 7/2008 |

OTHER PUBLICATIONS

Extended Search Report issued in European patent application No. 18193469.6 dated Feb. 1, 2019, 8 pages.

*Primary Examiner* — Yolanda L Wilson
(74) *Attorney, Agent, or Firm* — Brinks Gilson & Lione

(57) ABSTRACT

All modern enterprises rely completely on the continual correct execution of hardware and software resources that constitute the information technology (IT) infrastructure environment for the business. At the same time, hardware and software resources continually evolve, and the enterprise must often make changes to its infrastructure to incorporate the new or updated hardware and software resources. These changes are risky, and failure to properly execute the changes can result in infrastructure roll-backs and other failure modes that are often very disruptive to the enterprise. A guidance system for changes in infrastructure increases the likelihood of successful implementation of the changes. In some implementations, for example, the guidance system provides clear guidelines and checklists that depict success criteria, along with a scoring interface that pro-actively indicates the factors that can go wrong, and how to mitigate and plan for the factors in advance.

10 Claims, 16 Drawing Sheets

(51) Int. Cl.
*G06F 11/22* (2006.01)
*G06F 11/34* (2006.01)
*G06Q 10/06* (2012.01)

(56) References Cited

U.S. PATENT DOCUMENTS

| | | | | |
|---|---|---|---|---|
| 2010/0241891 A1* | 9/2010 | Beasley | ................ | G06F 11/008 |
| | | | | 714/1 |
| 2011/0283145 A1* | 11/2011 | Nemecek | .............. | G06F 11/008 |
| | | | | 714/37 |
| 2012/0053994 A1* | 3/2012 | Cowan | ................... | G06Q 10/06 |
| | | | | 705/7.38 |
| 2013/0073488 A1* | 3/2013 | Anderson | ............... | G06Q 10/04 |
| | | | | 706/12 |
| 2014/0181255 A1* | 6/2014 | Thomas | ................ | G06F 9/5072 |
| | | | | 709/217 |
| 2017/0357908 A1* | 12/2017 | Cabadi | ............... | G05B 13/0265 |

* cited by examiner

System executes partitioning algorithm, e.g., partitioning around medoids in conjunction with, e.g., Gower distance. In this example, the system detects five distinct clusters labeled: High Risk, Watch Dog, Medium Risk, Low Risk, and No Risk.

GUIDANCE SYSTEM FOR ENTERPRISE INFRASTRUCTURE CHANGE

TECHNICAL FIELD

This application relates to a guidance system and failure mode analysis for changes in infrastructure, e.g., changes in information technology (IT) systems, to increase the likelihood of successful implementation of the changes.

BACKGROUND

All modern enterprises rely completely on the continual correct execution of hardware and software resources (e.g., switches, routers, and application packages) that constitute the information technology (IT) infrastructure environment for the business. At the same time, hardware and software resources continually evolve, and the enterprise must often make changes to its infrastructure to incorporate entirely new or updated hardware and software resources. These changes are risky, and failure to properly execute the changes can result in infrastructure roll-backs and other failure modes that are often very disruptive to the enterprise.

DETAILED DESCRIPTION

Figure 1:
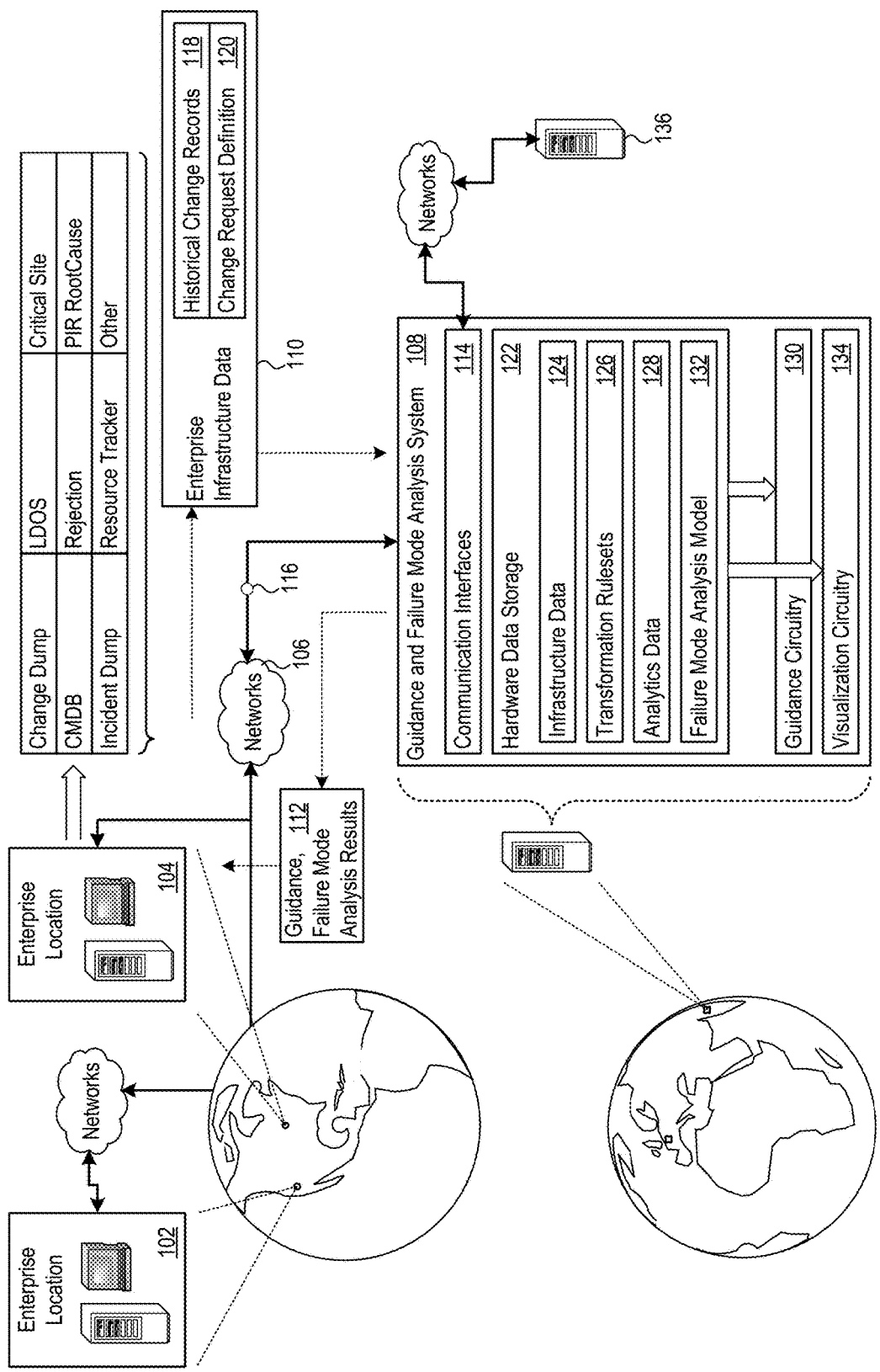
FIG. 1 shows enterprise entities communicating across a global network.

The Figures described below provide an example context for the discussion of technical solutions for a guidance system for failure mode analysis of scheduled or proposed enterprise infrastructure changes ("guidance system"). The examples in the Figures show one of many possible different implementation contexts. In that respect, the technical solutions are not limited in their application to the systems, processing, and logic shown in the Figures, but are applicable to many other implementations, architectures, and processing. Although the discussion below primarily uses the example of installing a new power-over-Ethernet (PoE) network switch, the functionality of the architecture extends to any other type of hardware or software infrastructure change.

Infrastructure change is a crucial aspect of the IT process for all enterprises. Changes can be of widely different types, e.g., initiated by user, due to client need, to expand the capabilities of the IT infrastructure, or needed for successful execution of a project. There are a wide range of internal and external aspects that make the tracking, monitoring and successful implementation of the changes labor intensive, complex, and challenging. Infrastructure change, however, is many times a decisive success factor in the ever-changing and evolving world of technology and the enterprise.

The guidance system described below includes guidance circuitry configured to successfully direct infrastructure change and provide clear guidelines and checklists that depict the success criteria. The guidance circuitry is also configured to indicate pro-actively a failure mode analysis of the factors that can go wrong and how to mitigate and plan for the factors in advance. In one implementation, the guidance system addresses infrastructure change by infusing advanced data analytics to predict and prescribe the right flow for a successful change and how to avert unsuccessful changes by taking the appropriate actions. The guidance system is extendible to a multi-enterprise solution where the guidance system developed for a particular enterprise can be efficiently leveraged across the breadth of all other enterprises, e.g., handled centrally as a set of Infrastructure Operations clients.

The guidance system may incorporate live-integration of its analysis into an existing change management process at the enterprise. This makes the guidance system less labor intensive, more efficient, and less prone to errors. The guidance system may implement failure mode analysis circuitry configured to train a failure mode analysis model including a change analysis model. The failure mode analysis model identifies distinct clusters of representative changes in a failure mode analysis parameter space, thereby segmenting changes into specific different failure levels. The failure levels may range from 'No Risk' to 'High Risk', as just one example. The failure mode analysis circuitry considers a failure mode analysis parameter space that may be a mixed-type parameter space, e.g., including both infrastructure change numerical parameters and infrastructure change categorical parameters.

The guidance system may also apply the failure mode analysis model to a proposed infrastructure change to generate a failure mode analysis interface. The failure mode analysis interface includes a failure mode analysis for the proposed infrastructure change. The failure mode analysis may specify characteristics for the determined specific failure level for the proposed infrastructure change that identify, e.g., why the proposed infrastructure change maps to the specific failure level according to historical infrastructure change records.

FIG. 1 shows enterprise entities communicating across a global network 100. In this example, the enterprise location 102 and the enterprise location 104 represent two of potentially many sites where IT infrastructure exists, and where infrastructure changes happen. The enterprise locations may be in any geographic region, e.g., United States, India, China, or Europe. Communication networks, e.g., the communication network 106, provide connectivity between the enterprise entities. The networks 106 may include private and public networks defined over any pre-determined and possibly dynamic internet protocol (IP) address ranges.

A guidance and failure mode analysis system ("guidance system") 108 executes complex analysis on enterprise infrastructure data 110 to return guidance and failure mode analysis 112 to the enterprise locations. In doing so, the guidance system 108 takes into account, e.g., the details of failed and successful historical infrastructure changes captured in the enterprise infrastructure data 110 as infrastructure change data records over pre-defined analysis time windows. The guidance system 108 may also train a failure mode analysis model on the historical changes captured in historical infrastructure change data records 118.

The guidance system 108 applies the failure mode analysis model to newly proposed infrastructure changes, e.g., at the enterprise location 104, to generate the failure mode analysis 112. The failure mode analysis 112 may take the form of a failure mode analysis interface that reports on the likelihood of success or failure for the newly proposed infrastructure change, or that provides guidance or checklists for increasing the chance of successful implementation of the proposed infrastructure change. The operation of the guidance system 108 is described in more detail below.

In the example in FIG. 1, the guidance system 108 includes communication interfaces 114 that establish communication channels with other entities in the global network 100. Similarly, the communication interfaces in the enterprise locations also establish communication channels with the other entities in the global network 100. A few examples of communication channels running on top of the communication physical hardware include: HTTP, HTTPS, FTP, SMTP, Web Services, SOAP over HTTP/HTTPs, and REST over HTTP/HTTPs communication channels. In particular, FIG. 1 shows an infrastructure communication channel 116 to the enterprise locations.

For the purposes of discussion below, the enterprise location 104 is a software developer working on a new project for a driverless car simulation engine. The enterprise location 104 needs to replace an old network switch with a new managed power over Ethernet (PoE) switch that supports many more ports and Gigabit speeds. In one implementation, the guidance system 108 receives a corresponding historical infrastructure change data record 118 for the specific infrastructure change request, namely the replacement of the network switch. The historical infrastructure change data record 118 is another example of data that may be included in the enterprise infrastructure data 110. In some instances, infrastructure change request definitions and historical change records may take the form of Configuration Items (CIs). The CIs capture what is changing and may be expressed in any pre-defined terminology or representational format.

The guidance system 108 includes hardware data storage 122. In one implementation, the hardware data storage 122 stores infrastructure data 124 (e.g., the historical infrastructure change records 118 and the infrastructure change request definitions 120) received from the enterprise locations. Transformation rulesets 126 guide the translation (if any is done) from the received infrastructure data 124 to a normalized failure mode analysis representation that the analytics data 128 adheres to for analysis. The normalized failure mode analysis representation may be any pre-defined data format or schema that the guidance circuitry 130 employs to build and train the failure mode analysis model 132.

As will be described in more detail below, the guidance circuitry 130 is configured to receive the infrastructure change request definition 120 and apply the failure mode analysis model 132 to the infrastructure change request definition 120. The guidance circuitry 130 may responsively generate a failure mode analysis interface (e.g., in a GUI) comprising a specific failure model analysis (e.g., as textual and graphical data elements in the GUI) for the infrastructure change request. The guidance circuitry also transmits over the physical communication interface, to the enterprise location 104, the failure mode analysis interface, e.g., as part of the guidance and failure mode analysis 112.

The guidance system 108 also includes visualization circuitry 134. The visualization circuitry is configured to communicate with the guidance circuitry 130 to render the failure mode analysis interface for delivery to the enterprise location. As just one example, the visualization circuitry may be a visualization server 136, e.g., a Tableau™ interactive data visualization server.

Figure 2:
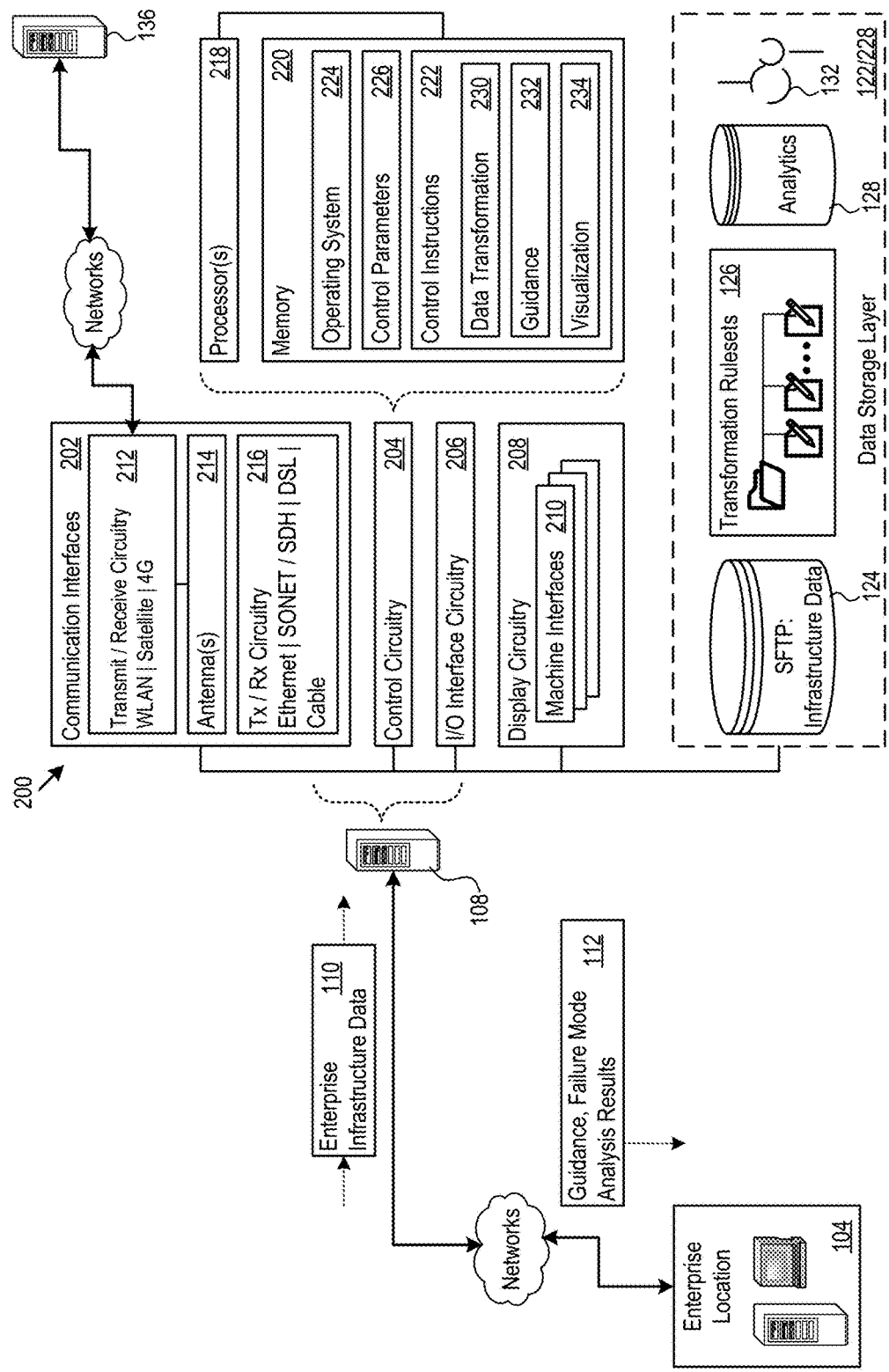
FIG. 2 shows an example implementation of the guidance system.

FIG. 2 shows an example implementation 200 of the guidance system 108. The guidance system 108 includes communication interfaces 202, control circuitry 204, input/output (I/O) interface circuitry 206, and display circuitry 208. The guidance system 108 generates the machine interfaces 210 (e.g., GUIs) locally using the display circuitry 208, or for remote visualization, e.g., as HTML, JavaScript, audio, and video output for a web browser running on a local or remote machine. In some implementations, the visualization server 136 may fill the role of the display circuitry 208. Among other interfaces, the machine interfaces 210 may include interfaces for historical change data record submission, definition of newly proposed change requests, submission of newly proposed change requests to the guidance system 108, and generation of root cause analysis reports and change rejection reports.

The machine interfaces 210 and the I/O interface circuitry 206 may include touch sensitive displays, voice or facial recognition inputs, keyboards, mice, speakers and other user interface elements. Additional examples of the I/O interface circuitry 206 include microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include hardware such as wireless transmitters and receivers ("transceivers") 212 and any antennas 214 used by the transmit and receive circuitry of the transceivers 212. The transceivers 212 and antennas 214 may support W-iFi network communications, for instance, under any version of IEEE 802.11, e.g., 802.11n or 802.11ac. The communication interfaces 202 may also include physical medium transceivers 216. The physical medium transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The control circuitry 204 may include any combination of hardware, software, firmware, or other circuitry. The control circuitry 204 may be implemented, for example, with one or more systems on a chip (SoC), application specific integrated circuits (ASIC), microprocessors, discrete analog and digital circuits, and other circuitry. The control circuitry 204 may implement any desired functionality in the guidance system 108, including the guidance circuitry 130 and the visualization circuitry 134, and may implement all or part of the hardware data storage 122.

As just one example, the control circuitry 204 may include one or more instruction processors 218 and memories 220. The memories 220 store, for example, control instructions 222 and an operating system 224. In one implementation, the processor 218 executes the control instructions 222 and the operating system 224 to carry out any desired functionality for the guidance system 108, including the functionality described above and below change guidance and failure mode analysis. The control parameters 226 provide and specify configuration and operating options for the control instructions 222, operating system 224, and other functionality of the guidance system 108.

The example implementation 200 includes a data storage layer 228 that hosts any number of local data repositories and analysis models. In the example shown in FIG. 2, the data storage layer 228 includes the infrastructure data 124, the transformation rulesets 126, the analytics data 128, and the failure mode analysis model 132. While the data storage layer 228 is shown local to the guidance system 108, the guidance system 108 may connect to any network entity to access and exchange other sources of infrastructure data, or any other data that facilitates change guidance and failure mode analysis.

The control instructions 222 drive the functionality of the guidance system 108. Described in more detail below, the control instructions 222 may implement data transformation logic 230, guidance logic 232, and visualization logic 234. The data transformation logic 230 carries out the translation (if any) from the incoming infrastructure data (including data from ticketing tools, various reports, and other infrastructure data), according to the transformation rulesets 126, to obtain analytics data 128 in the normalized failure mode analysis representation. The guidance logic 232 may build and train the failure mode analysis model 132. In addition, the guidance logic 232 applies the failure mode analysis model 132 to the infrastructure change request definitions in order to generate failure mode analysis interfaces that report on the infrastructure change requests. The visualization logic 234 may be a data visualization application package configured to generate the failure mode analysis interfaces. In other implementations, the visualization logic 234 may serve visualization requests and receive visualization responses (e.g., the analysis interfaces) from a visualization server 136.

The guidance circuitry 130, visualization circuitry 134, data storage layer 228, as well as the structure and content of the generated GUIs improve the operation and function of the underlying computer hardware itself. That is, these features (among others described below) are specific improvements in way that the underlying computer system operates and solve technical challenges with failure mode analysis. The improvements facilitate more efficient, accurate, consistent, and precise failure mode analysis and actionable insights delivered through change guidance. The improved functioning of the underlying computer hardware itself achieves further technical benefits. For example, the guidance system 108 avoids lack of automation, reduces manual intervention, reduces the possibility for human error, and therefore facilitates proper execution of infrastructure changes, many of which are critical to continued system operations.

Validation tests of the guidance system 108 bear out the improved operation noted above. In one set of tests over an 11 month period, the top two 'High Risk' and 'Watch Dog' clusters captured 78% of the total unsuccessful (e.g., either completed with issues or unsuccessful) changes. Also, 70% of the purely unsuccessful changes were captured by the top two clusters. In the validation data, 54 changes were considered with the status of 46 changes made and 8 changes with pending review status. Out of the 46 changes, 44 were successes and 2 changes were completed with issues, and the guidance system successfully captured them in the two Watchdog and Medium Risk clusters. The validation tests indicate that, for example, the guidance system can direct system operators to take action on or review 41% (rather than 100%) of total proposed changes in order to help avoid issues with what would otherwise be 78% of unsuccessful changes. Without the guidance system, 78% of the unsuccessful changes would have gone undetected.

Figure 3:
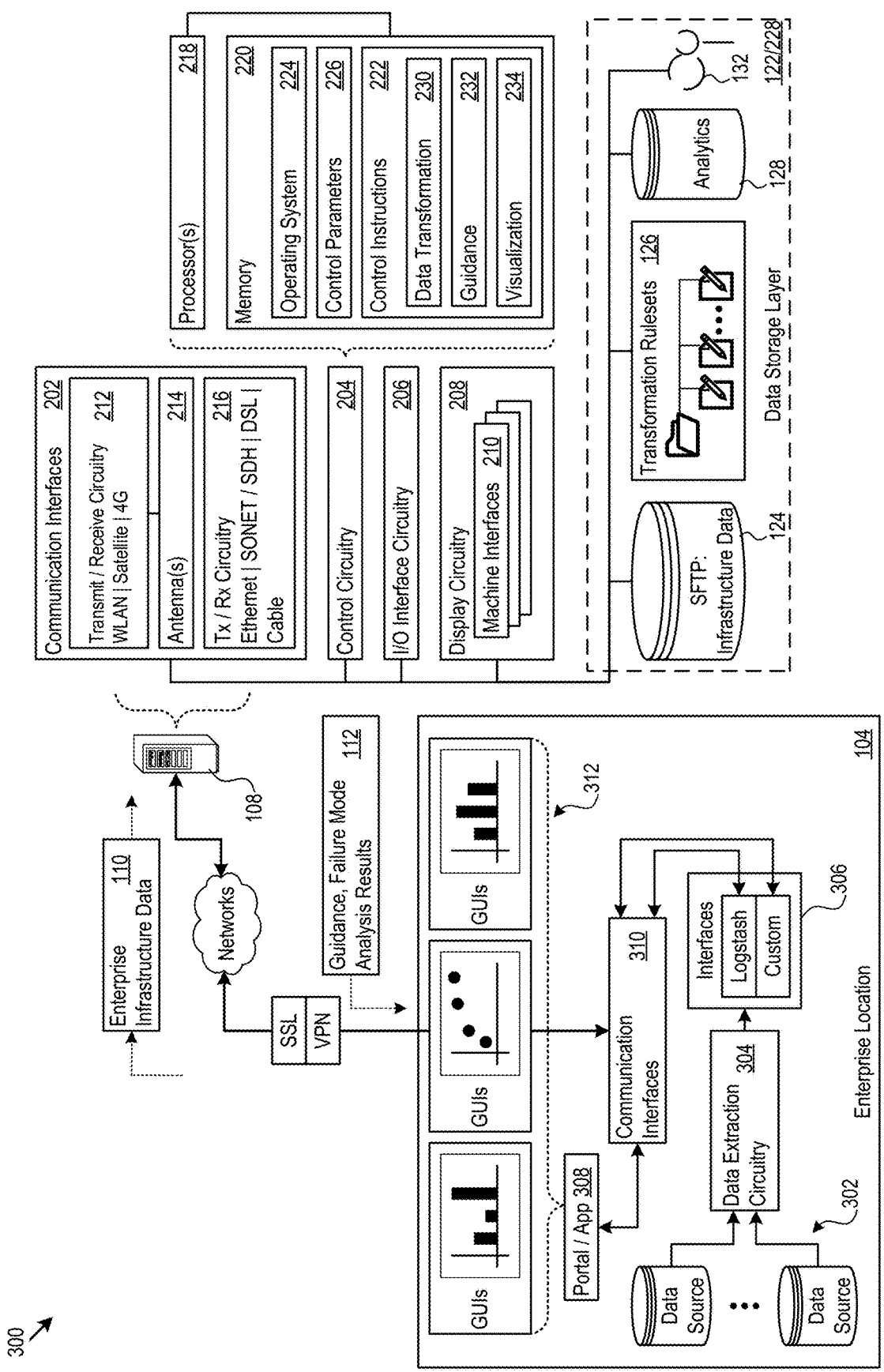
FIG. 3 shows another implementation of the guidance system as well as an enterprise location.

FIG. 3 shows another implementation 300 of the guidance system 108 as well as the enterprise location 104. In this example, the enterprise location 104 includes data sources 302, data extraction circuitry 304, and extraction interfaces 306. The data sources 302 may be any repository of historical change data, including implementation analysis and implementation results, for instance. The data extraction circuitry 304 may, as examples, hardware executed shell scripts or robotic process automation (RPA) that transfer, on any pre-determined schedule or event, enterprise infrastructure data 110 to the guidance system 108.

The optional extraction interfaces 306 may include specific data formatting and scheduling logic. As one example, the extraction interfaces 306 may include a Logstash™ process that executes to record and securely transmit enterprise infrastructure data 110 via SSL or VPN to a Logstash instance in the guidance system 108. In some cases, the guidance system 108 receives the enterprise infrastructure data 110 via a secure file transfer protocol (SFTP) interface.

FIG. 3 also shows that the enterprise location 104 may connect to the guidance system 108 through a portal interface 308 running over the hardware communication interfaces 310. In other implementations, an individual associated with the enterprise location 104 may connect to the guidance system 108 through a smartphone application or other interface. The portal/application interface 308 receives and locally displays the failure mode analysis interface 312 that the guidance system 108 generates. Examples are discussed below.

Figure 4:
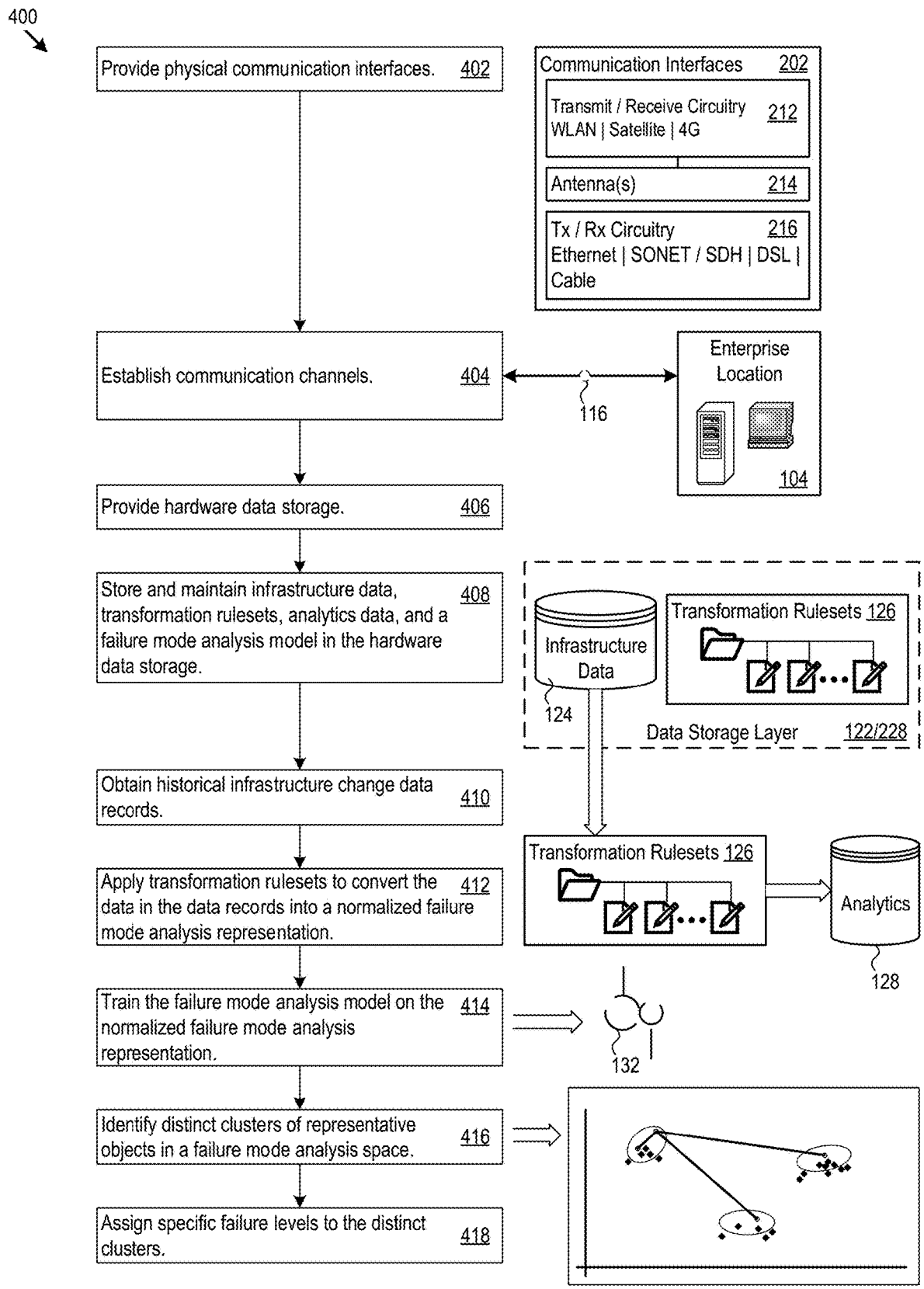
FIG. 4 shows an example of the logic implemented by the guidance system.

FIG. 4 show an example of the logic implemented by the guidance system 108, including in the guidance circuitry 130, visualization circuitry 134, e.g., as implemented in the control circuitry 204. The guidance system 108 provides physical communication interfaces 202 (402) and establishes communication channels running over the physical hardware (404). Examples of these communication channels include the infrastructure communication channel 116 to the enterprise locations.

The guidance system 108 also provides hardware data storage 122/228 (406) which may include solid state and magnetic hard disk storage drives and drive arrays, as examples. The guidance system 108 may organize the hardware data storage 122 in many different ways and use the hardware data storage 122 for many different purposes. For instance, the guidance system 108 may store infrastructure data 124, transformation rulesets 126, analytics data 128 and a failure mode analysis model 132 (408).

One role of the guidance circuitry 130 is to obtain historical infrastructure change data records 118 (410) and execute a transformation ruleset 126. The guidance circuitry 130 thereby is configured to convert the historical infrastructure change data records 118 into a normalized failure mode analysis representation (412). The guidance circuitry 130 creates and maintains the failure mode analysis model 132 by, e.g., training the failure mode analysis model 132 on the normalized failure model analysis representation (414) obtained from the change data records. In one implementation, the guidance circuitry 130 trains the failure mode analysis model 132 through data scoring executed by a statistical computing language, e.g., the R language.

With the trained failure mode analysis model, the guidance circuitry 130 may identify distinct clusters of representative objects (e.g., prior individual infrastructure changes) in a failure mode analysis parameter space (416). The failure mode analysis parameter space may comprise a mixed parameter space of both infrastructure change numerical parameters and infrastructure change categorical parameters. Further, the distinct clusters of representative objects may identify specific different failure levels (418).

Figure 5:
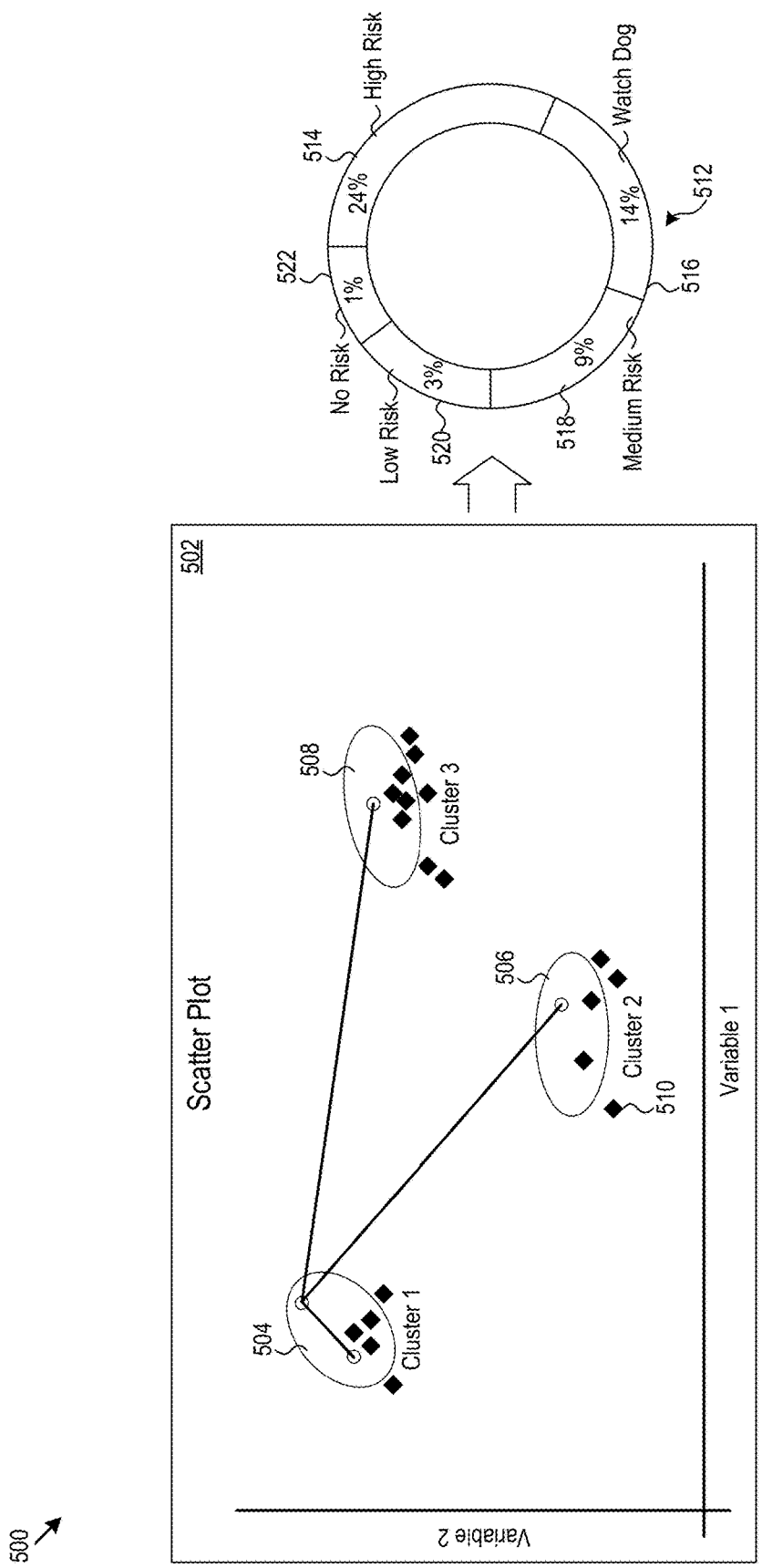
FIG. 5 shows an example of distinct clusters of representative objects (e.g., prior individual infrastructure changes) in a failure mode analysis parameter space.

FIG. 5 shows an example 500 of distinct clusters of representative objects (e.g., prior individual infrastructure changes) in a failure mode analysis parameter space 502. In this example, five clusters are identified, and three of them are shown and labeled as cluster 504, cluster 506, and cluster 508. The clusters are determined responsive to the individual objects, e.g., the prior infrastructure change 510. To find the clusters, the guidance system 108 may execute a partitioning algorithm, e.g., partitioning around medoids with a predetermined distance metric, e.g., Gower distance.

FIG. 5 also shows the assignment of the distinct clusters to specific failure levels in the level mapping 512. Specific failure levels may vary widely in definition between system implementations and even between individual clients. In this example, the system detects five distinct clusters and assigned them to failure levels: High Risk 514 (failure rate 24%), Watch Dog 516 (failure rate 14%), Medium Risk 518 (failure rate 9%), Low Risk 520 (failure rate 3%), and No Risk 522 (failure rate 1%).

Figure 6:
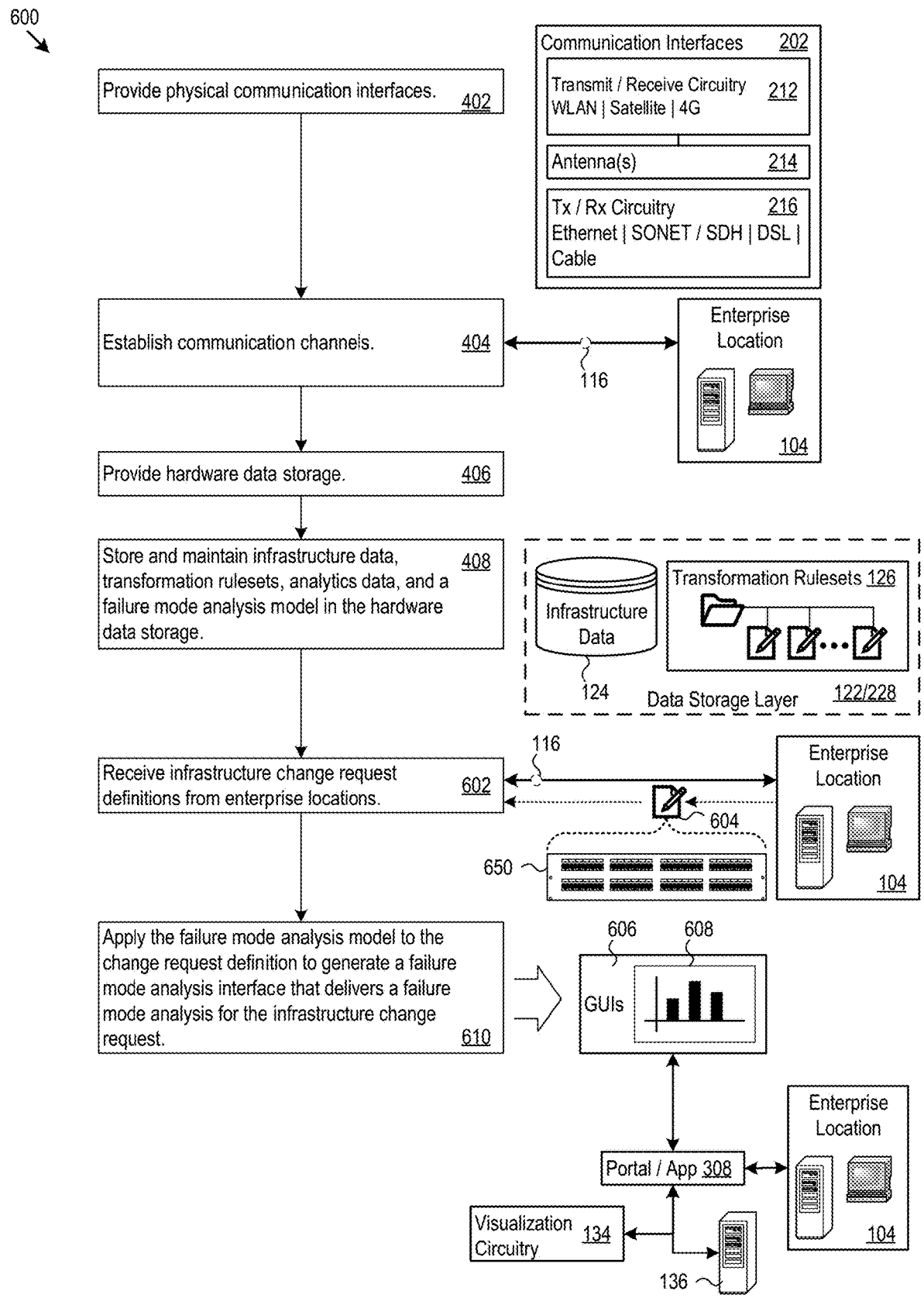
FIG. 6 shows another example of the logic implemented by the guidance system.

Continuing the example of FIG. 4, FIG. 6 shows another example of the logic implemented by the guidance circuitry 130. As noted before, the guidance circuitry 130 stores infrastructure data 124, transformation rulesets 126, analytics data 128 and a failure mode analysis model 132 in the data storage layer 122/228 (408).

Another role of the guidance circuitry 130 is to receive the infrastructure change request definitions from enterprise locations (602). For instance, the guidance circuitry 130 may receive a change request definition 604 from the enterprise location 104 that specifies a proposed installation of a new power-over-Ethernet (PoE) network switch 650.

Infrastructure change requests may take various forms that differ between implementations of the guidance system 108. As just one example, the guidance system 108 may require that infrastructure change requests include at least the data fields noted below in Table 1.

TABLE 1

Infrastructure Change Request

| Field | Notes |
| --- | --- |
| Critical Sites | Those enterprise sites that are critical to the enterprise operation, and that are impacted by the proposed change. |
| Change Duration | How long the change is expected to take. |
| Risk of Change | The perceived risk level of the change. For instance, a proposed change that would cause significant disruption if it fails may be tagged as 'High' risk. This tag is distinct from the later categorization of the proposed change into a failure level, e.g., 'High Risk', which indicates the overall propensity of the proposed change to fail, based on many factors, including the perceived 'Risk of Change'. |
| Type of Change | The category of the change, e.g., a 'standard' change, a 'normal' change, a 'non-production' change, an 'expedited' change, or an 'emergency' change. |
| CI | Configuration items included in the request. |

The guidance circuitry 130 applies the failure mode analysis model 132 to the change request definition 604 to generate a failure mode analysis interface 606 comprising a failure model analysis 608 for the infrastructure change request (610). The guidance circuitry 130 transmits, over the physical communication interface 202, to the enterprise location 104, the failure mode analysis interface 606. As noted above, the guidance circuitry 130 may provide a portal interface 308 for the enterprise location 104 to receive the failure mode analysis.

In some cases, the guidance system 108 may generate that failure mode analysis interface 606 using local visualization circuitry 134. In other cases, the guidance system may transmit an interface generation request to separate visualization circuitry, e.g., the visualization server 136. The visualization server 136 renders the failure mode analysis interface for delivery to the enterprise location 104 directly through a portal of its own, or indirectly by returning the interface to the guidance system 108 for deliver to the enterprise location 104.

Figure 7:
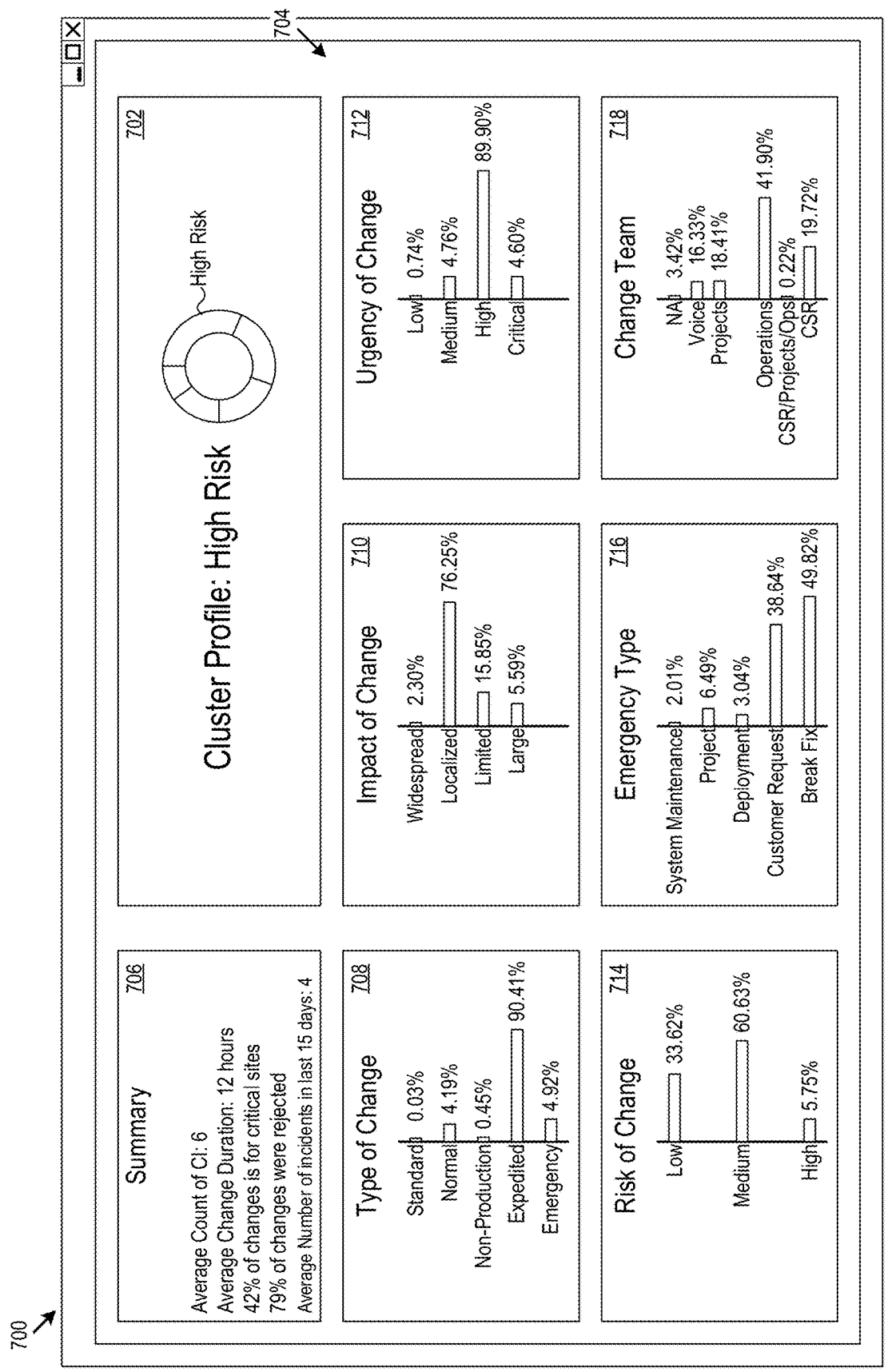
FIGS. 7-10 show example failure mode analysis interfaces.

FIGS. 7-10 show example failure mode analysis interfaces 700, 800, 900, and respectively. The failure mode analysis interfaces may deliver any of a wide range of failure mode data to the enterprise location 104. FIG. 7 shows one example in which the failure mode analysis interface 700 includes a failure mapping 702 of the specific infrastructure change request (e.g., for the network switch) to a specific failure level (e.g., 'High Risk') among the specific different failure levels.

Figure 8:
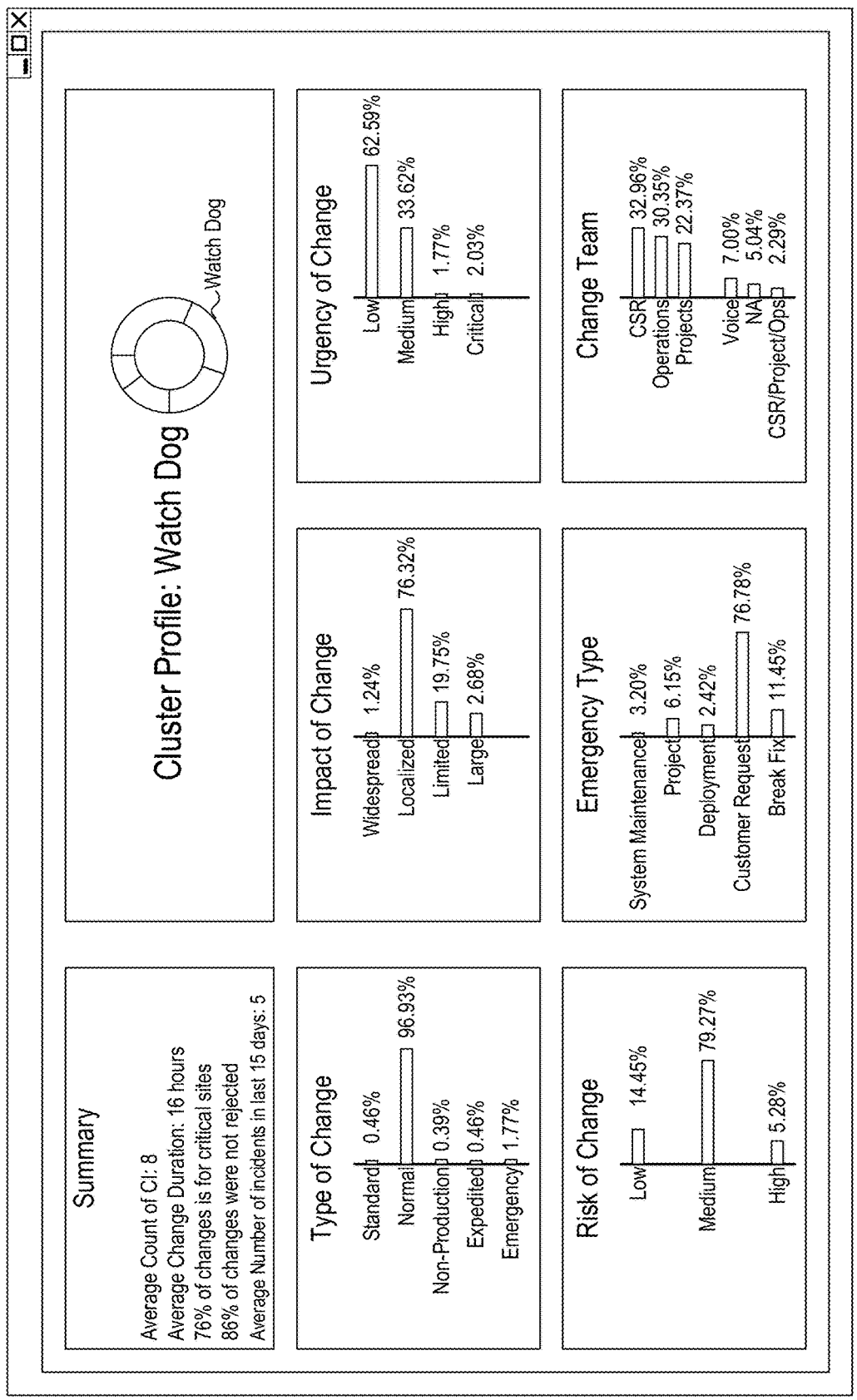
Figure 9:
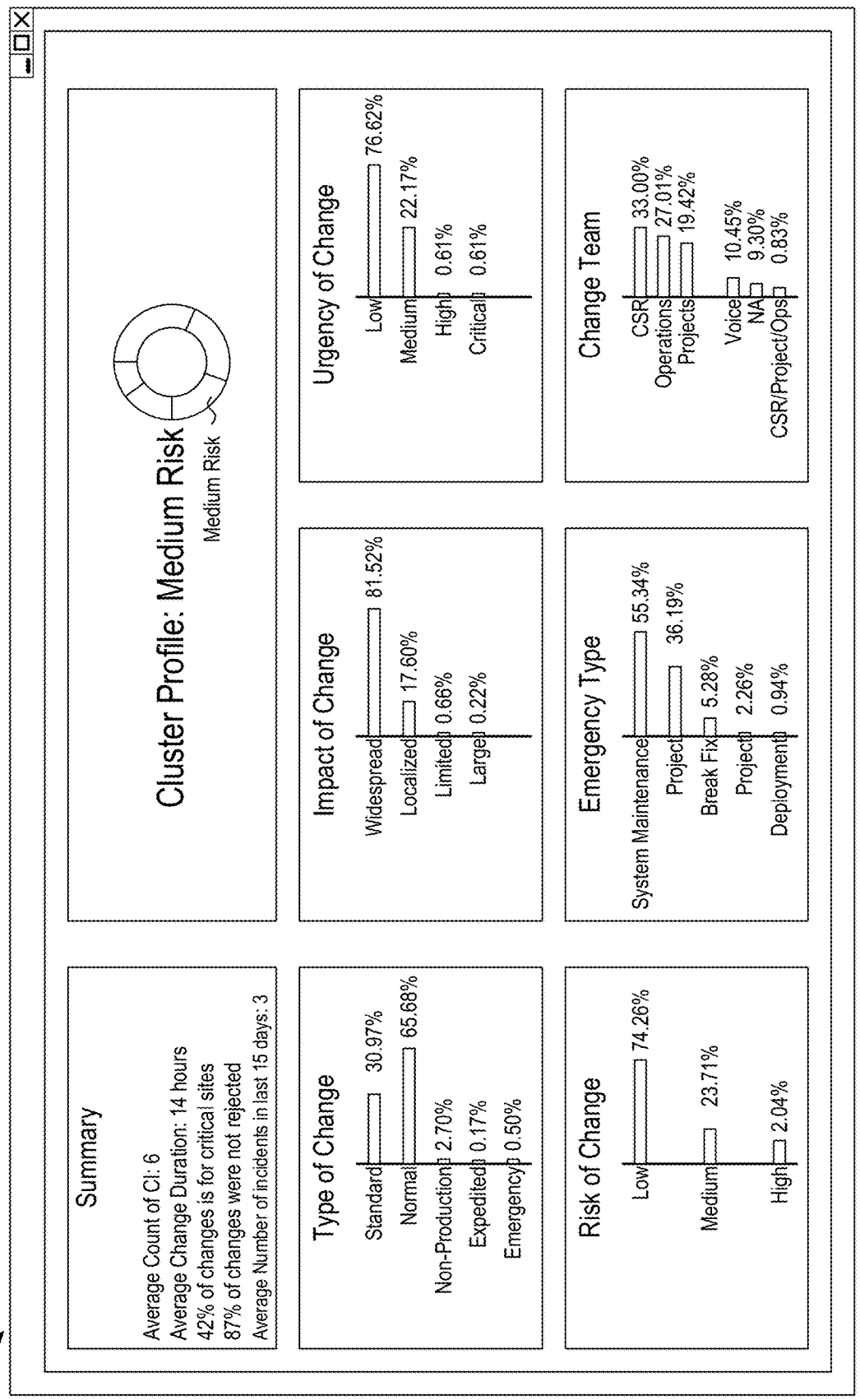

FIG. 7 also shows that the failure mode analysis interface 700 includes the failure mode characteristics 704 for the specific failure level 'High Risk'. The failure mode characteristics 704 identify he characteristics (e.g., the cluster profile) of a 'High Risk' change, and therefore, why historical infrastructure changes indicate that a newly proposed infrastructure change request maps to the specific failure level. Expressed another way, a newly proposed infrastructure change that matches the characteristics or cluster profile for 'High Risk' is likely to fall into that particular failure level. FIGS. 8 and 9 show example failure mode analysis interfaces for the 'Watch Dog' failure level and the 'Medium Risk' failure level, respectively.

The failure mode characteristics 704 may vary widely. In this example, the failure mode characteristics 704 include summary characteristics 706. The summary characteristics 706 provide an overview of the change attributes leading to the 'High Risk' level, such as the average count of CIs received, the average duration of prior changes, the percentage of changes for critical enterprise sites, the percentage of rejected changes, and the average number of incidents in a selected time period, e.g., 15 days.

In this example, the failure mode characteristics 704 also include further variables. In some cases the variables are already present in the historical change data that is received. In other cases, the guidance circuitry 130 may derive these variables from data present in the historical change data. FIG. 7 shows:

1) a 'type of change' failure mode characteristic 708 that indicates that 'Expedited' changes are often associated with 'High Risk' levels;

2) an 'Impact of change' failure mode characteristic 710 that indicates that 'Localized' changes are often associated with 'High Risk' levels;

3) an 'urgency of change' failure mode characteristic 712 that indicates that 'High' urgency changes are often associated with 'High Risk' levels;

4) a 'risk of change' failure mode characteristic 714 that indicates that changes considered 'Medium' and 'Low' actually are often associated with 'High Risk' levels;

5) an 'emergency type' failure mode characteristic 716 that indicates that 'customer request' and 'break fix' changes are often associated with 'High Risk' levels; and a 'change team' failure mode characteristic 718 that indicates that changes performed by 'operations' and 'CSR' individuals are often associated with 'High Risk' levels.

FIGS. 8 and 9 show example failure mode analysis interfaces 800 and 900 for the 'Watch Dog' failure level and the 'Medium Risk' failure level, respectively. Although the interfaces 800 and 900 include the same types of characteristics as the example of FIG. 7, any interface may convey additional, different, or less information, as determined by the particular implementation of the guidance system 108 and the configuration of the guidance system 108 for any given client.

Figure 10:
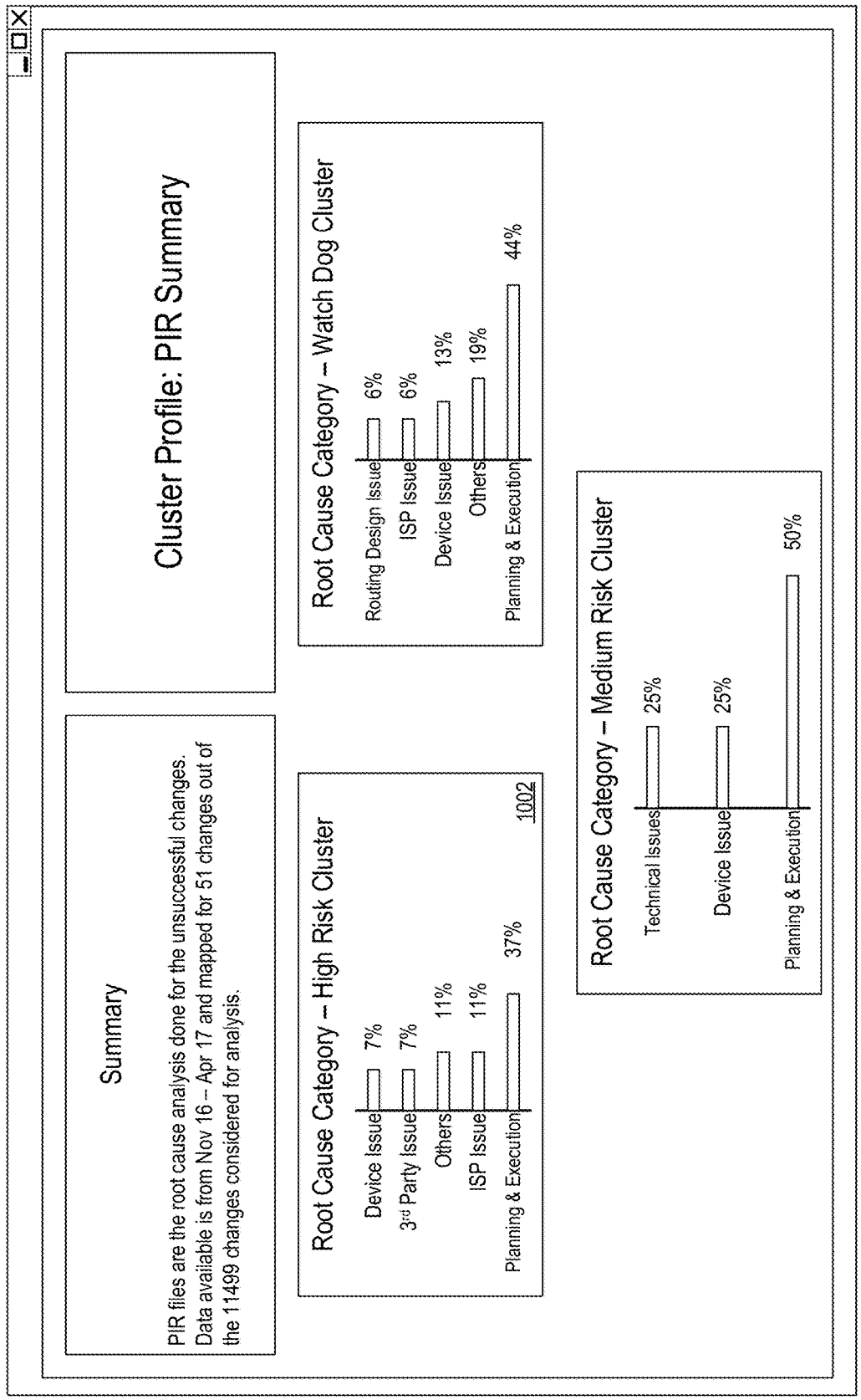

FIG. 10 shows another example failure mode analysis interface 1000. In particular, the interface 1000 is a root cause summary interface. In the example shown in FIG. 10, the interface 1000 shows the root cause that the guidance circuitry 130 discovered for the different failure levels assigned to the distinct clusters. For instance, in the 'High Risk' root cause summary 1002, 'planning and execution' is the most common root cause of issues with 'High Risk' unsuccessful infrastructure changes. In fact, in this example, the guidance circuitry 130 has discovered that 'planning and execution' is the root cause also for the 'Watch Dog' and 'Medium Risk' failure levels. While the example of FIG. 7 shows that the main root cause for risk is "planning and execution", there may be other combination of factors that renders a particular change at high risk or medium risk.

It was noted above that historical data records capture examples of prior infrastructure changes. The guidance system 108 creates and trains the failure mode analysis model 132 on the historical data records. Table 2 gives one example of the data fields and the source of the data fields that may be included in a historical data record, and many other data record implementations are possible.

TABLE 2

Historical Data Record

| Field | Data Source |
| --- | --- |
| Type | Change Record |
| Emergency Type | Change Record |
| Change Duration | Change Record |
| Count of CI | Change Record |
| List of Critical Sites | Critical Sites & Resource Tracker |
| Team | Critical Sites & Resource Tracker |
| Agent Name | Critical Sites & Resource Tracker |
| Count of Incidents in a pre-defined period | Incident Data |
| Incident start date | Incident Data |
| CI details for the incident | Incident Data |
| Device Type | Configuration Management Database |
| Deployment Date | Configuration Management Database |
| Device Location | Configuration Management Database |
| Device Site Identifier | Configuration Management Database |
| Manufacturer of Device | Configuration Management Database |
| Hardware support date | Last Day of Support (LDoS) Data |
| Software support date | Last Day of Support Data |
| CI Host name | Last Day of Support Data |
| Count of rejection | Change Rejection Data |
| Type of rejection | Change Rejection Data |
| Group rejecting the change | Change Rejection Data |
| Reason for rejection | Change Rejection Data |

The guidance circuitry 130 may derive, as noted above, additional variables for use in the creation or training of the failure mode analysis model 132, or for reporting in the failure mode analysis interfaces. Table 3 provides examples of derived variables.

TABLE 3

Derived Variables

| Variable | Data Type | Description |
| --- | --- | --- |
| Age | Numeric | Days elapsed since the device has been deployed to change start_date. |
| Count of incidents | Numeric | Number of incidents generated by the device in last 15 days from start of the change window. |
| Hardware Support flag | Numeric | Flag = 1 if the device last date of hardware support is less than change end date. |
| Software Support flag | Numeric | Flag = 1 if the device last date of software support is less than change end date. |
| Change duration | Numeric | Duration of the change between end_date and start_date in hrs. |

Figure 11:
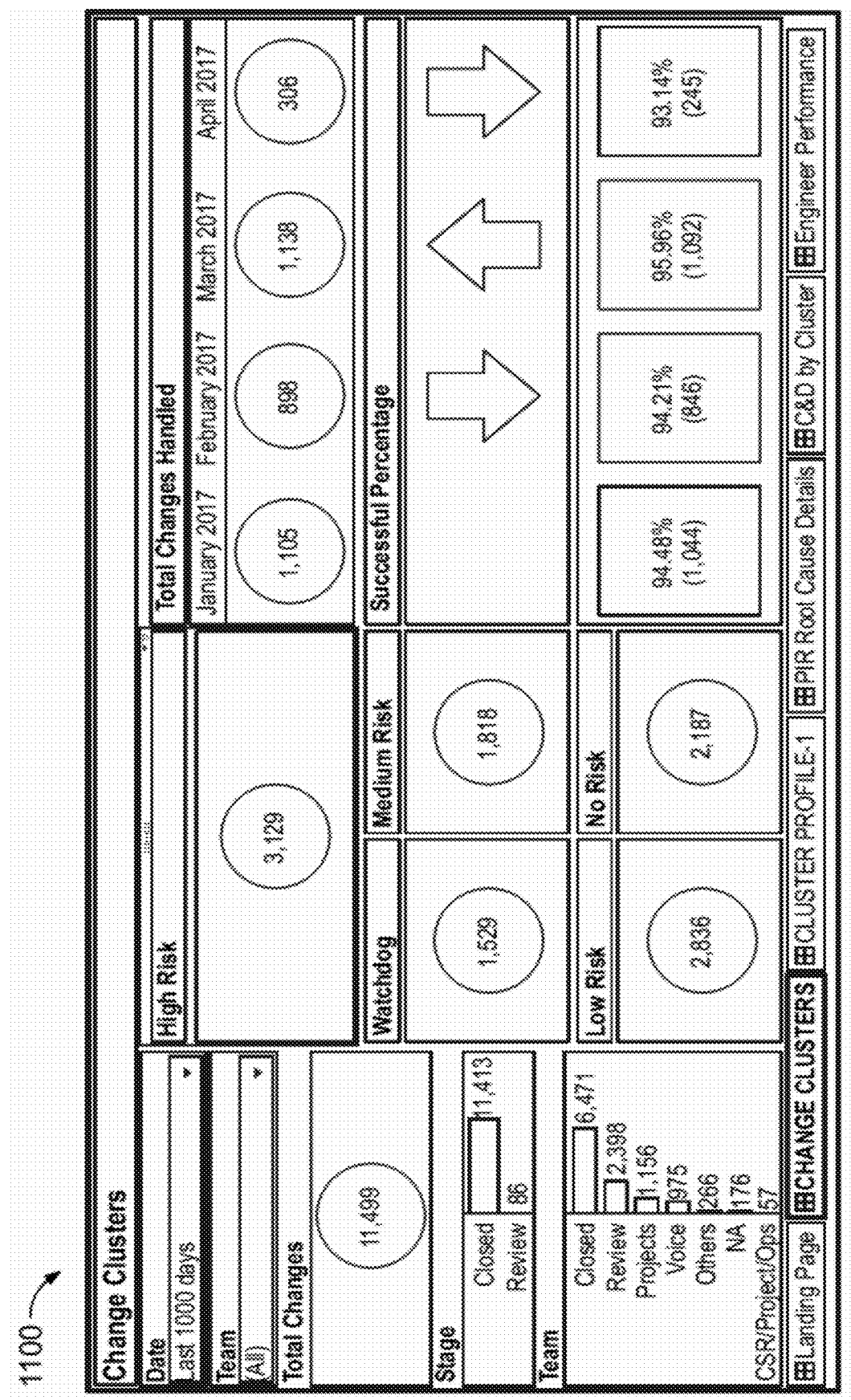
Figure 12A:
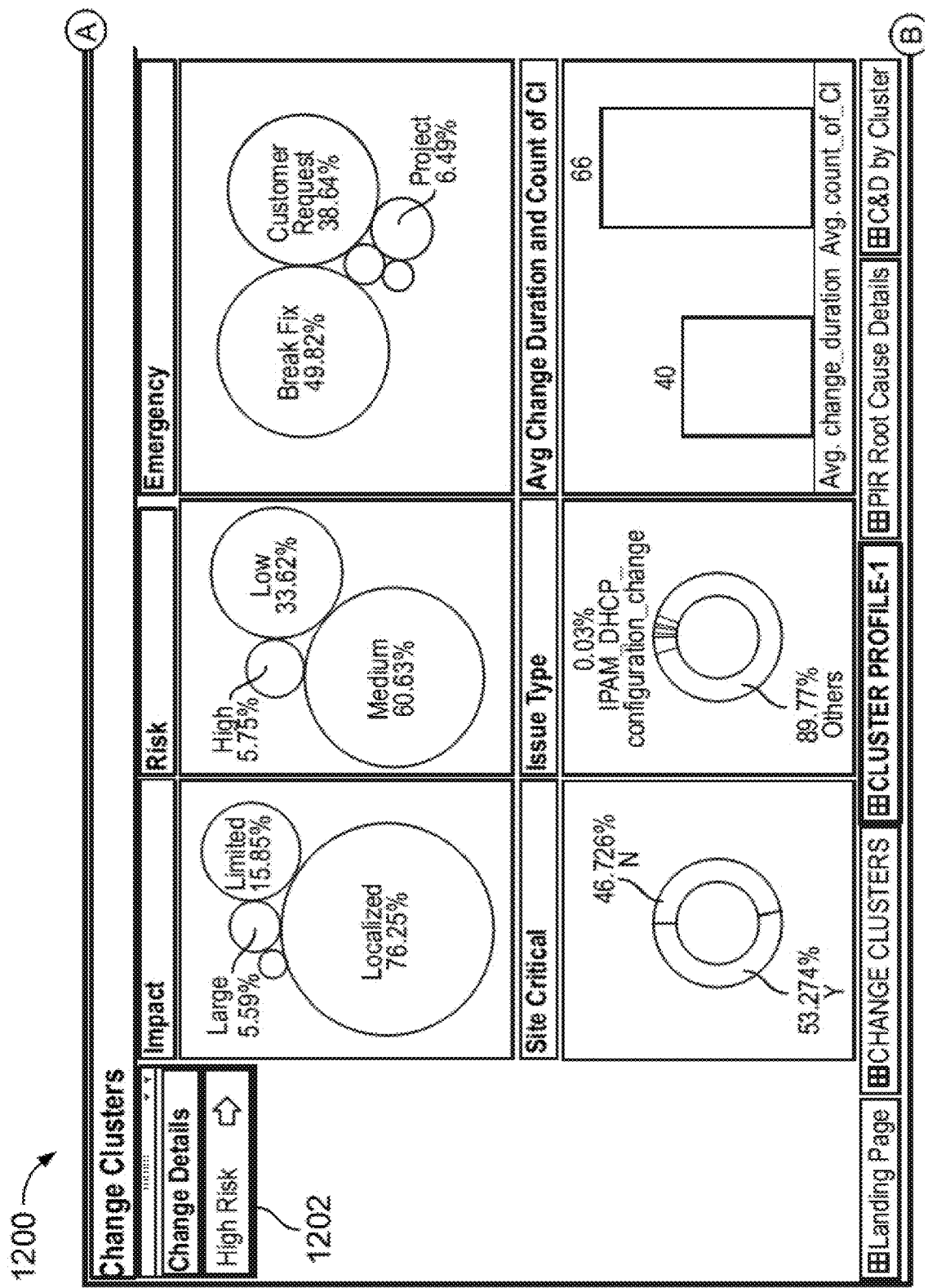
FIGS. 12-14 show additional examples of failure mode analysis interfaces.
Figure 12B:
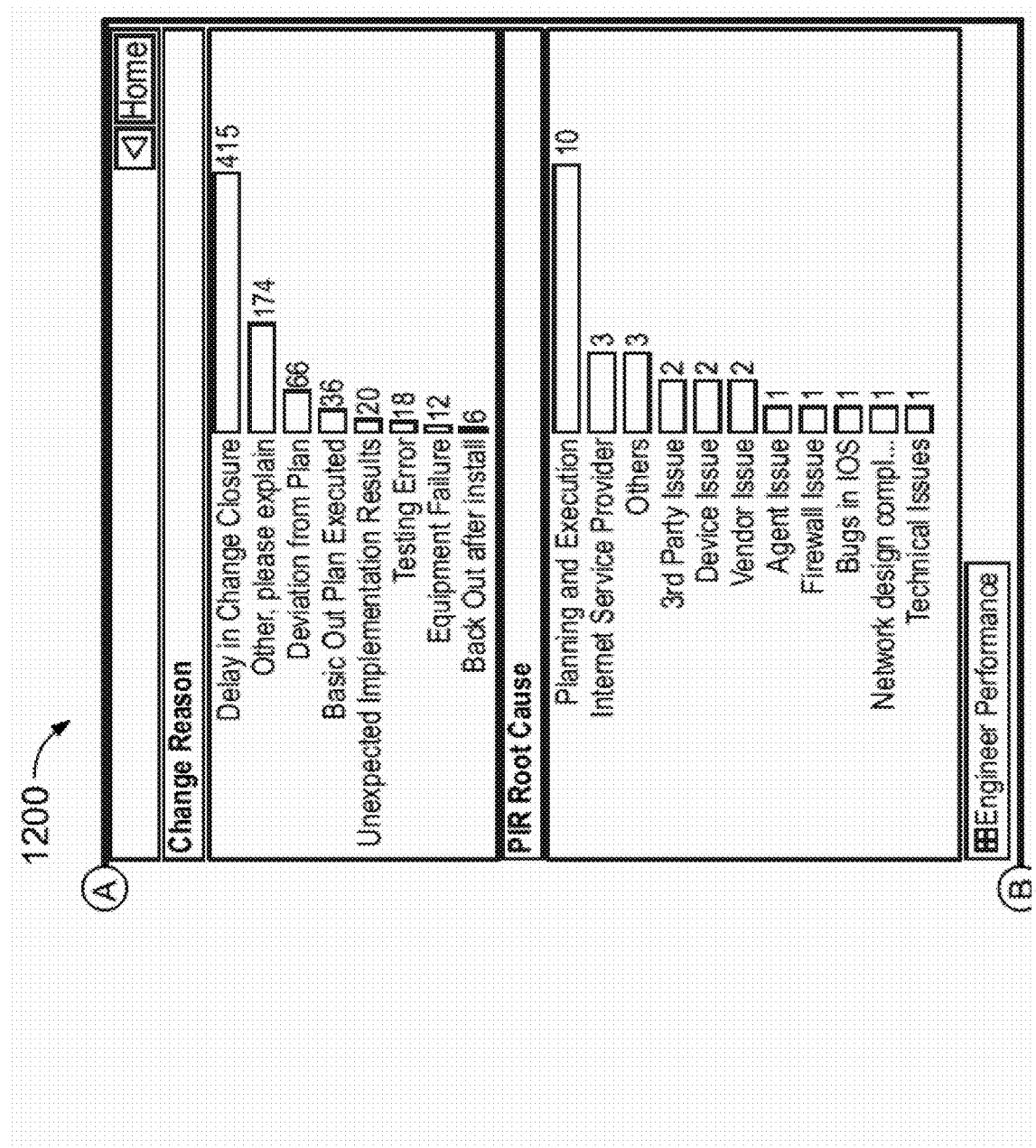

The guidance system 108 may implement a wide range of visualizations and GUIs, e.g., through the portal interface 308. FIGS. 7-10 were discussed above and show several examples. FIGS. 11-14 show additional examples in a sequence of linked, drill-down, interfaces to increasingly detailed information that underlies the analysis performed by the guidance system 108. FIG. 11 shows a dashboard interface 1100 that reports existing analysis on historical data and the resultant cluster profiles. Each cluster profile shows the associated CI count, e.g., 3129 CIs for the 'High Risk' cluster, i.e., 3129 changes in the "High Risk" cluster. Clicking on a given cluster transitions to a detail view. FIGS. 12A and 12B shows a dashboard interface 1200 that provides a detailed view of the failure mode characteristics of the 'High Risk' cluster. In this example, the failure mode characteristics include items such as the 'impact' scope, the perceived 'risk' level, the 'emergency' type, which were also discussed above in other examples. FIGS. 12A and 12B also incorporates the PIR root cause information into the same dashboard interface as the failure mode characteristics.

Figure 13A:
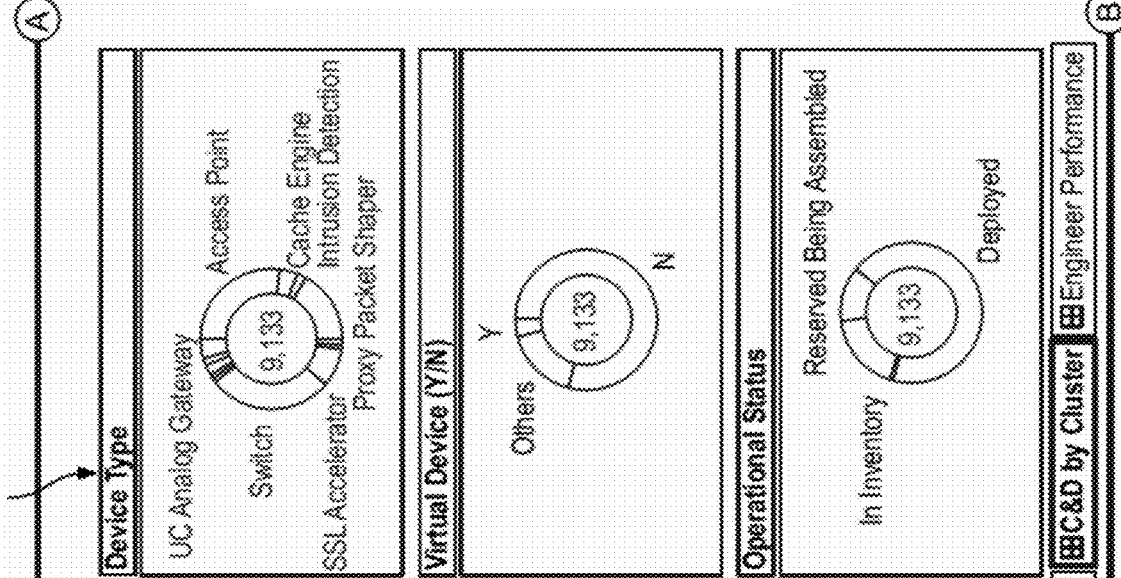
Figure 13B:
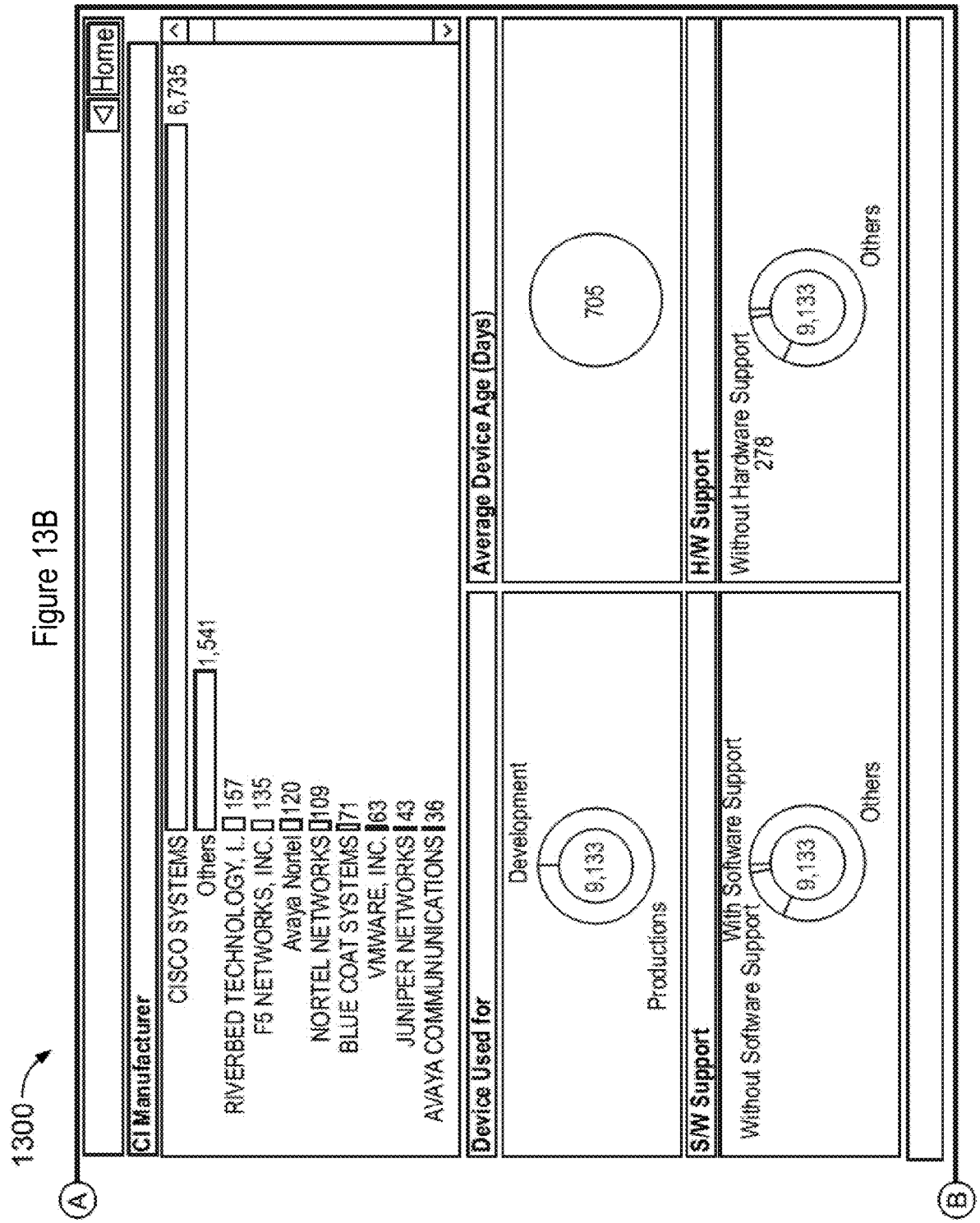

FIGS. 13A and 13B shows a dashboard interface 1300 that provides a detailed view of the individual changes as well as device level information for those changes, when clicking on the change details interface element 1202 of FIG. 12A. Accordingly, FIGS. 13A and 13B shows a change list panel 1302 listing all the changes. Clicking on any given change in the change list panel 1302 causes the dashboard interface 1300 to populate the details pane 1304 with the details for the selected change. Example details include device type, device manufacturer, and operational status. An engineer display panel 1306 populates with the name of the engineer currently working on the change.

Figure 14:
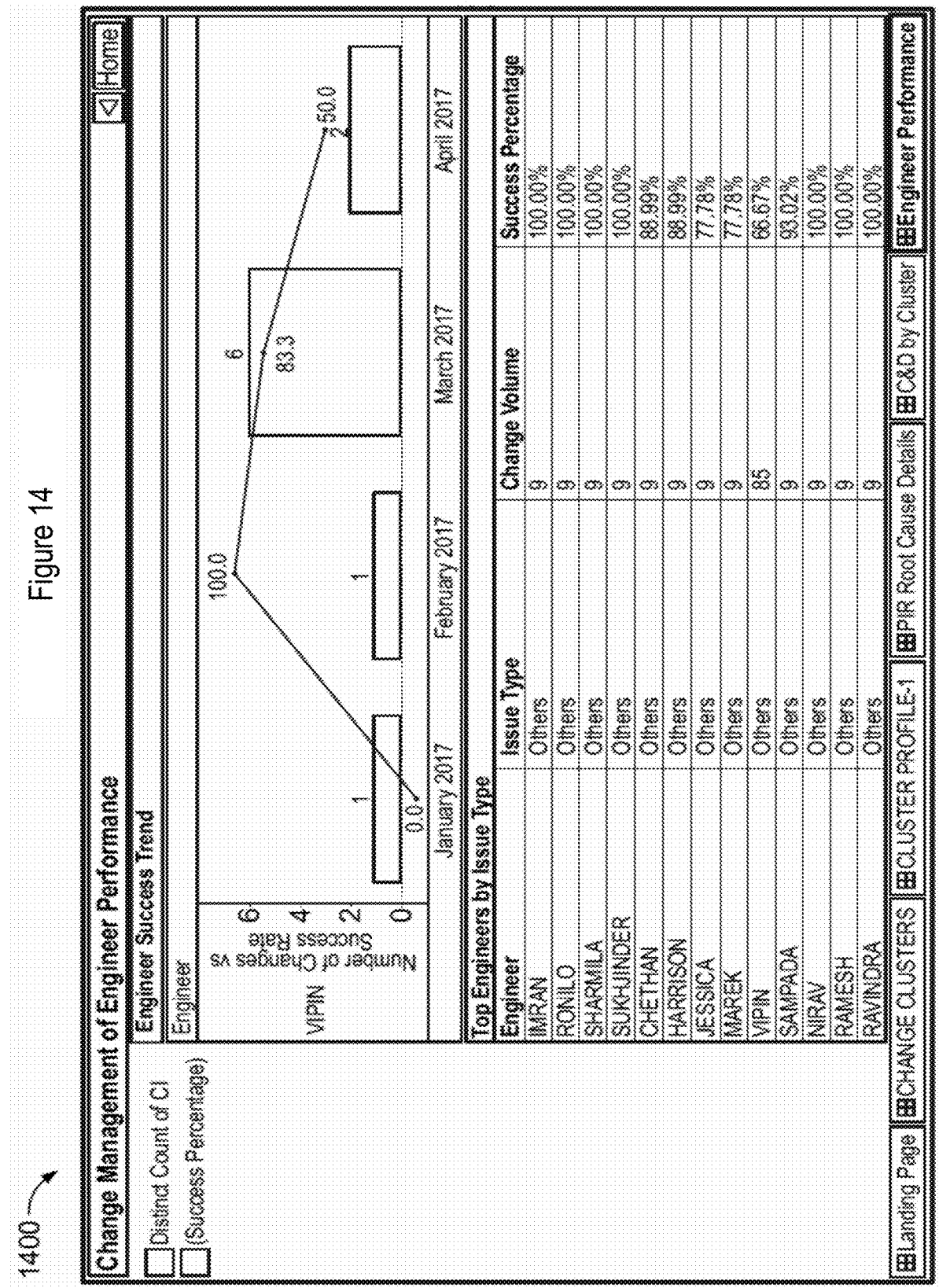

Engineer details are also available, e.g., by clicking on the engineer name in the engineer display panel 1306 of FIG. 12A. FIG. 14 shows an example engineer display interface 1400. In this example, the engineer display interface 1400 includes engineer statistics, such as success rate over time, number of CIs, and issue types addressed.

The infrastructure change guidance system disclosed above replaces a resource intensive and reactive process with an intelligent and pro-active system. The guidance system facilitates predicting potential change failures with high accuracy, significantly reduces resource intensive change reviews, and decreases change failure rate. As such, the guidance system disclosed helps avoid revenue loss. The guidance system further helps identify devices that are prone to change failures, identify engineers who are skilled for a particular type of change implementation, and provide the identified engineers with potential causes for predicted failure and past root causes to enable the identified engineers with actionable insights. The improved functioning of the underlying computer hardware itself achieves further technical benefits. For example, the guidance system 108 avoids lack of automation, reduces manual intervention, reduces the possibility for human error, and therefore facilitates proper execution of infrastructure changes, many of which are critical to continued system operations.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Several implementations have been specifically described. However, many other implementations are also possible.

What is claimed is:

1. A system comprising:
a physical communication interface configured to implement a communication channel to an enterprise data source;
hardware data storage configured to store:
enterprise infrastructure data received from the enterprise data source, the enterprise infrastructure data including:
an infrastructure change request definition for a specific infrastructure change request; and
historical infrastructure change data records;
a transformation ruleset configured to convert the historical infrastructure change data records into a normalized failure mode analysis representation; and
a failure mode analysis model trained on the normalized failure model analysis representation; and
guidance circuitry configured to:
train the failure mode analysis model to identify distinct clusters of representative objects in a failure mode analysis parameter space by partitioning the failure mode analysis parameter space based on a predetermined distance metric, the failure mode analysis parameter space comprising mixed infrastructure change numerical parameters and infrastructure change categorical parameters, and the failure mode analysis model trained using the normalized failure mode analysis representation of the historical infrastructure change data;
associate the distinct clusters with a predetermined set of infrastructure change risk levels based on the trained failure mode analysis model;
receive the infrastructure change request definition;
apply the failure mode analysis model to the infrastructure change request definition to generate a failure mode analysis interface comprising a failure model analysis for the infrastructure change request; and
transmit over the physical communication interface, to the enterprise data source, the failure mode analysis interface,
where the failure mode analysis interface comprises:
an indication of an infrastructure change risk level among the predetermined set of infrastructure change risk levels for the infrastructure change request as determined by the failure model analysis; and
a report of failure mode characteristics identifying historical infrastructure change data records used to map the specific infrastructure change request to a specific failure level and provide a guideline and a checklist for describing success criteria guidance for implementation of the specific infrastructure request and a failure root cause.

2. The system of claim 1, further comprising:
visualization circuitry; and where:
the guidance circuitry is configured to communicate with the visualization circuitry to render the failure mode analysis interface for delivery to the enterprise data source.

3. The system of claim 2, where:
the visualization circuitry comprises a visualization server.

4. The system of claim 1, where:
the failure mode analysis interface comprises a failure mapping of the specific infrastructure change request to a specific, further comprising:
rendering, in the failure mode analysis interface, a failure mapping of the specific infrastructure change request to a specific level among the predetermined set of infrastructure change risk levels.

5. A method comprising:
establishing, over a physical communication interface, a communication channel to an enterprise data source;
storing, in hardware data storage:
enterprise infrastructure data received from the enterprise data source, the enterprise infrastructure data including:
an infrastructure change request definition for a specific infrastructure change request; and
historical infrastructure change data records;
a transformation ruleset configured to convert the historical infrastructure change data records into a normalized failure mode analysis representation; and
a failure mode analysis model trained on the normalized failure model analysis representation; and
with guidance circuitry:
training the failure mode analysis model with the normalized failure mode analysis representation of the historical infrastructure change data to identify distinct clusters of representative objects in a failure mode analysis parameter space by partitioning the failure mode analysis parameter space based on a predetermined distance metric, the failure mode analysis parameter space comprising mixed infrastructure change numerical parameters and infrastructure change categorical parameters;
associating the distinct clusters with a predetermined set of infrastructure change risk levels based on the trained failure mode analysis model;
receiving the infrastructure change request definition;
applying the failure mode analysis model to the infrastructure request definition to generate a failure mode analysis interface comprising a failure model analysis for the infrastructure change request; and
transmitting over the physical communication interface, to the enterprise data source, the failure mode analysis interface,
where the failure mode analysis interface comprises:
an indication of an infrastructure change risk level among the predetermined set of infrastructure change risk levels for the infrastructure change request as determined by the failure model analysis; and
a report of failure mode characteristics identifying historical infrastructure change data records used to map the specific infrastructure change request to a specific failure level and provide a guideline and a checklist for describing success criteria guidance for implementation of the specific infrastructure request and a failure root cause.

6. The method of claim 5, further comprising:
providing visualization circuitry; and
with the guidance circuitry, communicating with the visualization circuitry to render the failure mode analysis interface for delivery to the enterprise data source.

7. The method of claim 6, where:
providing visualization circuitry comprises providing a visualization server.

8. The method of claim 5, further comprising:
rendering, in the failure mode analysis interface, a failure mapping of the specific infrastructure change request to a specific risk level among the predetermined set of infrastructure change risk levels.

9. A non-transitory computer-readable medium comprising instructions, where the instructions, when executed by one or more processors, cause the processor to:
establish, over a physical communication interface, a communication channel to an enterprise data source;
store, in hardware data storage:
enterprise infrastructure data received from the enterprise data source, the enterprise infrastructure data including:
an infrastructure change request definition for a specific infrastructure change request; and
historical infrastructure change data records;
convert, using a transformation ruleset, the historical infrastructure change data records into a normalized failure mode analysis representation;
train a failure mode analysis model on the normalized failure mode analysis representation to identify distinct clusters of representative objects in a failure mode analysis parameter space comprising mixed infrastructure change numerical parameters and infrastructure change categorical parameters by partitioning the failure mode analysis parameter space based on a predetermined distance metric;
associate the distinct clusters with a predetermined set of infrastructure change risk levels based on the trained failure mode analysis model;
receive the infrastructure change request definition;
apply the failure mode analysis model to the infrastructure change request definition to generate a failure mode analysis interface comprising a failure mode analysis for the infrastructure change request; and
transmit over the physical communication interface, to the enterprise data source, the failure mode analysis interface,
where the failure mode analysis interface comprises:
an indication of an infrastructure change risk level among the predetermined set of infrastructure change risk levels for the infrastructure change request as determined by the failure model analysis; and
a report of failure mode characteristics identifying historical infrastructure change data records used to map the specific infrastructure change request to a specific failure level and provide a guideline and a checklist for describing success criteria guidance for implementation of the specific infrastructure request and a failure root cause.

10. The non-transitory computer-readable medium of claim 9, where:
the failure mode analysis interface comprises a failure mapping of the specific infrastructure change request to a specific risk level among the predetermined set of infrastructure change risk levels.

* * * * *